United States Patent Office

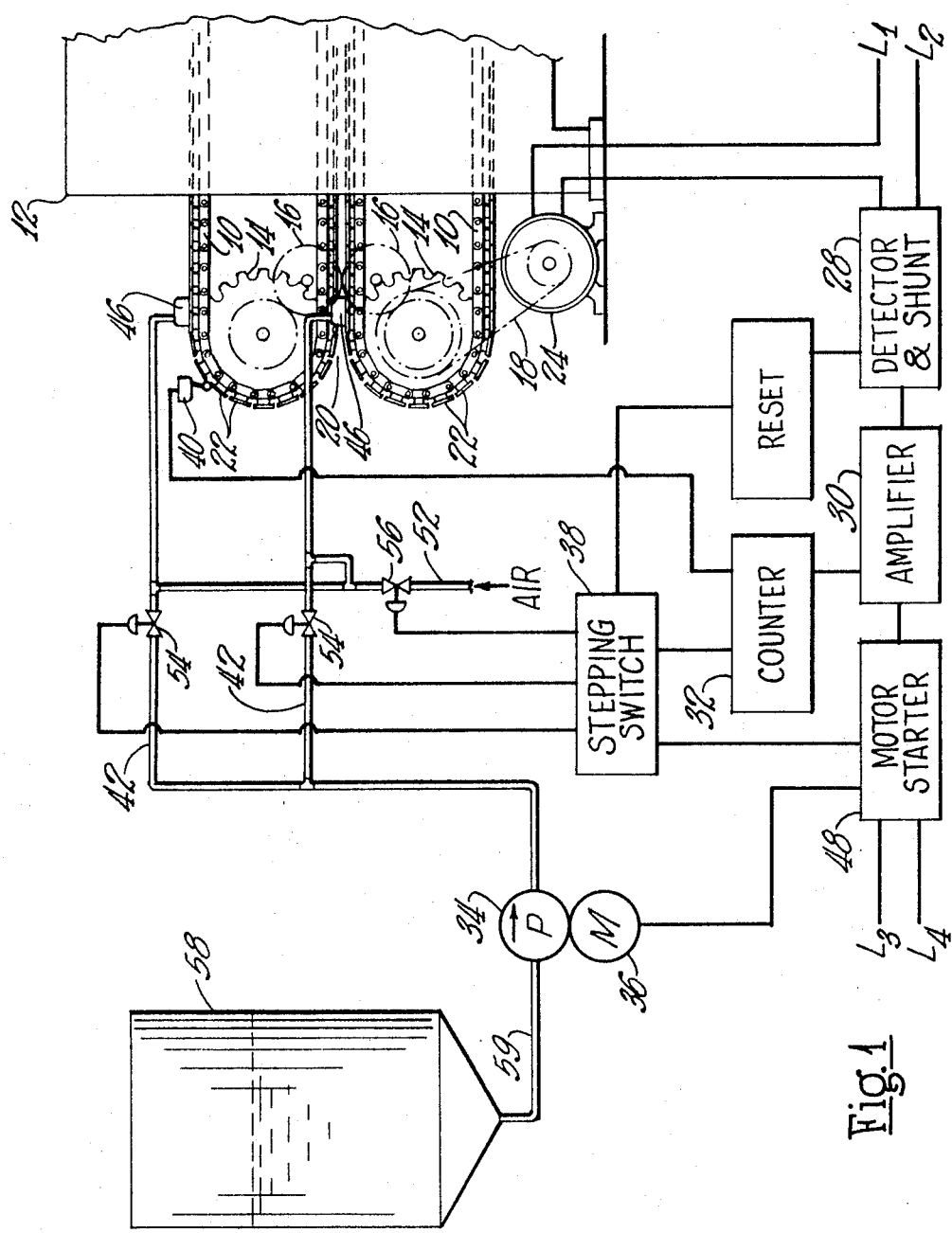

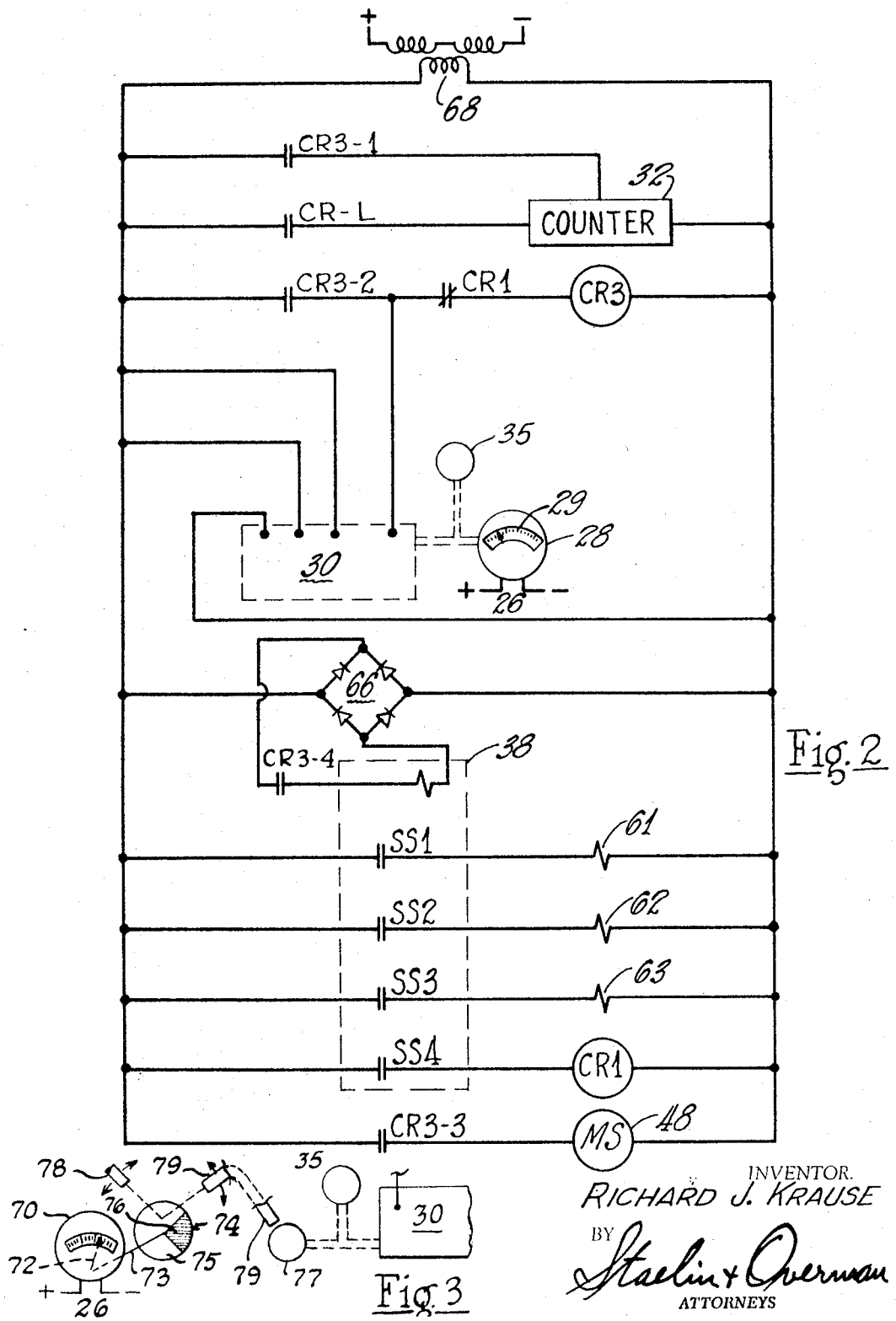

3,463,268
Patented Aug. 26, 1969

3,463,268
SELF-ACTUATED OILING SYSTEM
Richard J. Krause, Stratford, N.J., assignor to
Owens-Corning Fiberglas Corporation, a corporation of Delaware
Filed Nov. 14, 1966, Ser. No. 594,100
Int. Cl. F16n 1/00; F01m 1/00, 3/00
U.S. Cl. 184—1                         18 Claims

ABSTRACT OF THE DISCLOSURE

A self-lubricating electrically powered apparatus wherein the lubricity requirements of the apparatus are detected by determining an increase in the power required by the electric motor driving the apparatus. When an additional power requirement is indicated by the detector, a signal is dispatched therefrom to start a lubricating system which provides the required lubricity for the foregoing apparatus. After the lubricating system has been actuated and operated for a set period of time providing the apparatus with lubricant, a cyclic timing unit terminates any further operation of the lubricating system. The detector is then reset for detecting any further lubrication required.

---

This invention relates to a system and a method for lubricating apparatus. Specifically it relates to a self-lubricating system and method for apparatus which is driven by an electrical power source. The electrical power source has a detector interposed therein for determining electrical power increases in the power required by the apparatus, so that when such an increase is registered, indicating a requirement for additional lubricity by the apparatus, the detector will register and actuate the system to provide the lubricity required by the apparatus.

Background of the invention

Prior lubricating means for various apparatus have relied upon visual inspection, drag means upon the lubricated portion of the apparatus, or the wear characteristics of the item to be lubricated for the determination of the lubricant required. These systems are inadequate in an industrial situation where the lubricity should be maintained at an optimum at all times. The movement of machinery with the attendant requirement for lubricity thereof to prevent wear and malfunctions is a constant requirement in industry.

Lubrication systems in industry have generally relied upon wicks, hand applications, dripping reservoirs, immersions, constant pressure or periodically timed applications by mechanical means to lubricate moving machinery parts. A fast moving assembly line or apparatus where lubrication is required generally precludes a hand application of the lubrication required. The other foregoing methods of lubrication are found to be inadequate because of variant conditions existing with respect to the operation of industrial equipment which do not render the application of a lubricant in a constantly timed manner the most efficacious. Furthermore many of the foregoing methods have been found to be quite expensive, inasmuch as they expend large and excessive amounts of lubricant.

The foregoing general statements with respect to moving apparatus which require lubrication are particularly true where the moving object is a conveyor chain which moves through a curing oven. In this case, the various loads and materials on the conveyor and the attendant various high temperature requirements of the curing oven create lubrication conditions which vary during the continuous operation of the conveyor chain. The curing of various materials requires different temperatures depending upon the thickness, the density, and the amount of cure which is required of each respective material. The various amounts of lubrication are required with each particular process for curing each material respectively because of the various amounts of lubrication driven off during the time the chain is in the oven, and the various frictional loads imposed on the chains. Furthermore, if the material to be cured is of a particularly friable, powdery, or fibrous nature, the material often is enmeshed in or clogs the chain detracting from the effectiveness of the lubrication applied thereto requiring an increase in the amount of lubricant. This has been found to be particularly true in the manufacture of fibrous glass insulation, wherein fibrous glass is often accidentally engaged by the chain.

It has been found that during the continuous manufacture of glass wool a substantial decrease in operating efficiency is registered when a lack of lubricant exists on the chain which conveys the material through the curing oven. The lack of adequate lubricant accounts for a decrease in efficiency ranging upwards of 26% of the normal operating efficiency, and is the largest portion of the variable aspects of the load imposed on the drive motor which drives the conveyor chain through the oven even though different types of material are conveyed through the oven in different densities. The foregoing is exemplified by a large increase in the power required by the drive motor when the lubricant diminishes on the oven chain, even though the chain seems to be operating normally.

The instant invention facilitates the constant proper lubricity of moving apparatus or as in the specific embodiment herein, a conveyor chain. In the operation of the aforementioned glass wool conveyors through curing ovens, it was found that by using the instant invention a savings of six times the amount of lubricant normally consumed was effectuated. Furthermore, the previous discontinuity of lubrication on the conveyor chain causing wear and breakage was eliminated. It was also beneficial in providing an even amount of wear on all the conveyor chains, so that there were no imbalances within the conveyor system.

Objects of the invention

It can be seen from the foregoing discussion of the background of this invention that an object is to provide a reliable self-lubricating system for moving apparatus.

A further object of this invention is to maintain the lubricity of an electrically motor driven apparatus at a proper level during a fluctuating cyclic operation thereof.

Another object of this invention is to provide a means for preventing excess and uneven wear and deterioration on moving electrically motor driven parts.

A further object of this invention is to provide for the proper maintenance and consistent wear of conveyor chains passing through a glass-wool curing oven.

Another object of this invention is to determine the friction generated between parts in an electrically driven moving apparatus and provide for the attendant lubrication requirements therebetween.

Description of the drawings

FIGURE 1 shows a side view of a glass-wool curing oven conveyor chain with the self-lubricating system of this invention. The control circuitry of the lubricating system is in block diagram form.

FIGURE 2 shows the electrical control circuitry of the lubrication system with the wiring between each particular element deleted for clarification.

FIGURE 3 shows another detector-signal device which may be used in lieu of the one in the system shown in FIGURE 2.

Detailed description of the invention

The foregoing statements with respect to the invention are amplified in the following detailed description of a specific embodiment thereof, as described and shown in and with the drawings. Although the following detailed description of the invention and the operation thereof will be primarily limited to conveyor chains used for conveying fibrous glass wool and products made thereof through curing ovens, it should be noted that this invention has broad usage in other arts and industries where a proper degree of lubricity is desired between parts in an electrically powered moving apparatus.

As shown in FIGURE 1, the items to be lubricated in this specific embodiment of the invention are a matched pair of conveyor chains 10 shown at their input segments which pass through an oven 12. The conveyor chains 10 are driven by sprockets 14 which are connected for mutual rotation by gears 16. The driving sprockets 14 which are interconnected by gears 16 are driven by a semi-flexible drive means 18 passing over one of the sprockets 14. There are generally four conveyor chains 10 on each side of the curing oven 12 traveling over its respective sprockets 14, although the side view of FIGURES 1 shows only two. The conveyor chains 10 are located in dual stacked juxtaposition on either side of the oven 12, shown by the side view of FIGURE 1, so that each pair of dually stacked juxtaposed conveyor chains form a moving nip 20 between them. Affixed to each conveyor chain 10 are flights 22 or horizontally moving surfaces which move with chains 10 in adjacently spaced relationship with respect to each other. When the conveyor chains 10 are turning, the flights 22 come together in a juxtaposed operative relationship for the purpose of providing a nip 20. It can thus be seen that the material fed into the nip 20 between the flights 22 located between the upper and lower chains 10 is compressed by the flights 22 in a continuous manner while passing through the curing oven 12.

The conveyor chain 10 is exposed to the temperature and conditions which exist in the oven 12 as well as the material which is passed between the flights 22. If the material is friable or of a type which breaks off and clogs the chain 10, or if the oven 12 is running at a particularly high temperature the lubricant is driven off at a rapid rate.

The motor 24 used for driving the sprockets 14 may be of any particular type, but preferably a shunt wound direct current motor is used to maintain a constant conveyor chain 10 speed during the operation thereof. The motor 24 has starting means common to most large motors for bringing the motor 24 up to operating speed.

A detector 28 with a shunt 26 is placed within the lines L1 and L2 supplying direct current to the motor 24 for detecting changes in the power required thereby. If a direct current drive motor 24 is used, the detector 28 can be a D'Arsonval movement with an appropriate set point indicator 29. If the electric drive motor 24 used is driven by alternating current or a highly fluctuating direct current, the detection means can be a soft iron moving vane movement or an electric dynamometer with an appropriate set point indicator.

Whatever detection device is used, there should be an appropriate set point adjustment and dial 29 for establishing a level when the amperage or the power requirements of the motor 24 exceed a certain amount, which manifests an excessive frictional drag on the conveyor chain 10 indicating an improper degree of lubricity thereon. When the power requirements have been exceeded beyond the set point, the detector 28 and the amplifier 30 in connection therewith registers the increase and issues a signal.

It has been found in the specific embodiment of the invention herein shown in FIGURE 3 that a commercially available D'Arsonval movement detector 70 in conjunction with a direct current drive motor 24 for driving the sprocket 14 is the most appropriate. The commercially available detector 70 has a D'Arsonval movement 72, and movably affixed thereto by a shaft 73 is disk 74 which has its surface divided into a light reflective portion 75 and non-reflective portion 76. A light 78 is cast upon the disk and the reflection therefrom is conveyed by optical transmission means 79 to a photo-electric cell 77. The construction is such that significant reflections will normally occur when the D'Arsonval movement turns the disk and exposes its reflective portion to the light. Therefore, the set point of the D'Arsonval movement may be established by selecting an appropriate position for the light 78 and/or the transmission means 79 for locating the boundary between the reflective and non-reflective portions. Thus the rotational distance the disk moves with respect to the set point determines the power increase required by the electric drive motor. When the light has been reflected from the reflective portion of the disk and it is conducted by optical means 79 to the photoelectric cell 77 which responds and provides an electrical bridge (not shown) with an excess voltage thus transmitting a signal therethrough. At this point, the circuitry is the same as that used in conjunction with the detector-signal device 28 depicted in FIGURE 2. The foregoing D'Arsonval detector 70 precludes the necessity of mechanically contacting parts, and provides a finely delineated registration of the increased power required by the motor 24. Although other detector movements and contact devices may be used it has been found that the foregoing one is quite accurate and efficacious in determining the increase in power required by the drive motor 24.

After an electrical signal has been given by the detector 70 which doesn't have to be the specific one mentioned herein, it is amplified by an amplifier 30 into a signal which may be used to actuate and initiate the lubrication of the oven chain 10. The oven chain 10 in this embodiment is driven by the motor 24 being supplied with 250 amperes when the oven chain 10 is properly lubricated. It is found that when the lubricity on the chain 10 decreases, the amperage required to drive the motor 24 increases upwards of 300 amperes at which time the set point which has been established between 250 and 300 amperes will cause the detector 70 to register a required amperage increase. A signal is then transmitted by the amplifier 30 which initiates the lubrication of one conveyor chain 10 by energizing relay CR3 thus closing contact CR3-3 which actuates the pump motor starter 48 for starting the pump motor 36. The duration of the operation of the oil pump 34 is controlled by a counter 32 which is connected to actuate stepping switch 38. The counter is brought on line by contact CR3-1 closing when relay CR3 is energized. At the same time, contact CR3-4 is closed thereby operatively connecting stepping switch 38 via rectifier 66 to the counter 32.

The duration of lubrication for each conveyor chain 10 is one complete revolution thereof. The method of determining the length of travel of the conveyor chain 10 is accomplished by a contact switch 40 which is actuated by the movement of the flights 22 thereover in a limiting opened and closed manner. The contact switch 40 opens and closes upon the passage of each flight 22 thereover registering a signal for the counter 32 on each passage by opening and closing the contact CR-L. Thus a complete oiling cycle is determined by the number of flight 22 passages over the contact switch 40 and the attendant pulses which issue to the counter 32. The signal from the contact switch 40 which is pulsed into the counter 32 causes the counter 32 to actuate the stepping switch 38 after a pre-determined amount of counts. The successive actuations of the stepping switch 38 causes the contacts SS1 and SS2 therein to successively activate and deactivate solenoids 61 and 62 and thus valves 54 for sequentially directing the oil in the various oil lines 42 to each respective lubricating head 46. The pulses from the counter 32 after the oiling cycle further causes the stepping switch 38 to cut off the power leading through the pump motor lines L3 and L4 connected to the motor starter 48 and close contact SS3 which actuates the air purge solenoid 63 and thus valve 56 sending a high pressure stream of air from the air line 52 into the oil lines 42 and lubrication heads 46 to purge any remaining oil therein and prevent any clogging thereof. In cutting power to the pump, the stepping switch 38 closes contact SS4 which actuates the reset solenoid CR1 opening the control circuitry through contact CR1 for further detection by the detector 70 in the event more lubrication is required by the oven chain 10.

The foregoing selective oiling action allows a pump 34 and pump motor 36 with a limited pumping capacity to be used. If the system is used to lubricate apparatus other than the conveyor chain 10, the stepping switch 38 may be used to actuate one or more solenoids to send a lubricant through lines leading to the respective parts of the apparatus to be lubricated.

As previously explained, the specific embodiment herein utilizes the stepping switch 38 to actuate valves 54 for selectively channeling lubricant through a plurality of lines terminating at each conveyor chain 10 in a lubricating head 46 at the point where the lubrication is to be applied. Upon each revolution of the conveyor chain 10 the stepping switch successively operates contacts SS1 and SS2 which actuate oil valve solenoids 61 and 62 for switching the lubricant being pumped to another lubrication line by the valves 54. As formerly recited, at the end of the foregoing lubrication cycle the stepping switch 38 closes a contact SS3 which actuates the air purge solenoid 63 and contact SS4 which cuts the power through lines L3 and L4 connected to the pump motor starter 48. The air purge solenoid 63 is located so as to open a valve 56 in a high pressure air line 52. The high pressure air line 52 is connected to the oil spray heads 46 and lines 42 so that after termination of the lubrication cycle the oil remaining in the spray heads 46 will be purged therefrom, thus maintaining the spray heads 46 in an unclogged condition. This is particularly necessary where the oiling is performed around a hot environment such as the oven 12 herein, to prevent the solidifying and buildup of gum and oil deposits.

The stepping switch 38 resets the control circuit by contact SS4 closing which actuates the reset solenoid CR1 opening contact CR1 so that the circuit may then be used to detect any increases in amperage required by the electric motor 24 and enabling the entire lubrication cycle to be started again as indicated by any increased amount of amperage required by the drive motor 24.

The previous description of the control circuit and the apparatus to be lubricated has not included a description of the lubrication system per se. The lubrication system comprises a storage tank 58 which is supplied with oil and has a line 59 feeding therefrom to the inlet of the pump 34. The inlet side of the pump 34 allows an introduction of the lubricant from the storage tank 58 and a pumping thereof into the conduits 42 which lead to the lubrication heads 46 adjacent the conveyor chains 10 for lubrication thereof. The pump 34 is driven by a motor 36 which is connected to and started by the motor starter 48 previously mentioned. As previously stated, the conduits 42 have valves 54 therein with solenoids 61 and 62 for opening and closing the valves in sequence, so that if a low powered pump motor is used the pump 34 may be used to deliver oil in sequence to each one of the conveyor chains 10 without overloading the pump 34. The counter 32 as previously mentioned effectuates the sequential operation of the flow of oil through each conduit 42 respectively, or if a large enough pump motor 36 is provided the oil may flow through all the conduits 42 simultaneously.

Detailed operation of the invention

The operation of the invention is initiated by an increase in friction between the conveyor chain 10, the sprocket 14 and the parts they contact due to a lack of lubricity between them. The lack of lubricity on the conveyor chain 10 and the sprocket 14, and the parts they contact creates a drag on the drive system which is driven by the electric drive motor 24. Inasmuch as the electric drive motor 24 is a shunt wound direct current motor it will maintain a constant speed. However, the imposition of a drag thereon will cause the motor 24 to take more power from the lines L1 and L2 supplying the motor 24. The effect will be an amperage squared increase in proportion to the power consumed, with the D'Arsonval detector 70 within the power lines L1 and L2 registering a proportionate increase. The foregoing registration by the D'Arsonval detector manifests a direct correlation between the amperage required of the drive motor 24 and the lubricity of the chain 10 and other contacting parts, thus indicating any need for applying any additional lubrication thereto.

The set point within the detector 70 is adjusted with respect to the amperage required by the drive motor 24. After the D'Arsonval detector 70 registers an amperage increase which is correlated to the friction between the moving parts the signal is amplified through the amplifier 30. The signal amplified by the amplifier 30 closes contacts CR3–1, CR3–2, CR3–3 and CR3–4 by actuating relay CR3. Contact CR3–3 brings the motor starter 48 on line for starting the pump motor 36. After being brought on line the pump 34 forces oil through the conduits 42 to the lubrication heads 46. Also, when CR3 is actuated, contact CR3–1 closes bringing on line the counter 32. As can be seen from the diagram the counter 32 is actuated by each count of the limit switch 40 which contacts the flights 22, and is actuated each time a flight 22 passes thereover. Each time the contact limit switch 40 is actuated, it closes contact CR–L and sends a pulse to the counter 32. The counter 32 counts the number of pulses which indicate the number of flight passages. After an appropriate number of pulses are counted indicating a complete revolution of the conveyor chain 10, the stepping switch 38 is actuated and switches on the next respective solenoid in line for conduction of lubrication through the appropriate oil conduit 42. After all the oil conduits 42 have applied lubrication to each respective conveyor chain 10, the stepping switch 38 is activated by the counter 32 thereby closing contact SS4 for cutting the power to the pump motor 36 through the motor starter 48. The stepping switch also closes contact SS3 at this juncture which actuates the air purge solenoid 63 which opens the air valve 56 forcing air from the air line 52 through the lubrication heads 46 purging any residual lubrication therefrom.

By closing contacts SS4, the entire circuit which is supplied by the control circuit power source 68 is reset by opening contact CR1 to permit the detector 28 to further register any increases in the current flowing to the drive motor 24 which in turn indicates an inordinate amount of friction between the chain 10 and associated parts.

The foregoing specific embodiment of this invention can be modified by connecting between the detector-signal means and the amplifiers a device for timing the duration of overloads on the motor. The overload timing device 35 can be in the form of a time delay relay or other means as long as the duration of the overload is determined. In this manner surges of power for short periods will not activate the lubrication system and the system will only function by a protracted overload being registered.

Subsequent to the measured duration of timed overload, a means for actuating the oiling cycle may be employed to start the lubrication of the apparatus. The self lubrication system may then be controlled as it was in the foregoing description.

It has been assumed that the system would not be operating at a steady state condition, and the set point would be above the level of erratic departures not caused merely by frictional overloading. However, if a machine or apparatus were to operate at a substantially steady state condition, and the only overloads would be frictionally imposed, the foregoing timed duration devices would not be necessary. Furthermore a high enough set point precluding operation of the detector and the attendant operation of the lubrication means may be employed. Thus the lubrication means would only function when the load imposed frictionally in addition to peak operating increases exceeded the set point value of the detector.

In the foregoing description of the invention, it will be apparent to those skilled in the art that various modifications may be made without departing from the scope and spirit of the invention.

I claim:

1. A system for detecting the friction in an apparatus driven by an electric motor and accordingly decreasing the friction thereof by providing lubrication to the apparatus comprising:
   a detector for providing a signal when an increase in the power required by the electric motor driving the apparatus is detected due to an increase of friction within the apparatus;
   means for lubricating the apparatus;
   means for starting said lubrication means to lubricate the apparatus when a signal is received from said detector so that when an increase in power is required by the motor due to friction within the apparatus as detected, the signal provided by said detector will initiate the operation of the lubrication means thus decreasing the friction within the apparatus.

2. A system for self lubricating an apparatus driven by an electric motor comprising:
   lubricating means;
   a detector for detecting an increase in the power above a selected level required by the electric motor due to an increase in friction on the apparatus;
   means for providing a signal when said detector registers an increase in the power above a selected level required by the electric motor so that the signal provided by said signal means will start the lubrication means in order to self lubricate the apparatus and decrease the friction thereof.

3. A system for self lubricating an apparatus driven by an electric motor as described in claim 2 further comprising:
   a device for stopping said lubrication means after said lubrication means has lubricated the apparatus during a selected period of operation thereof.

4. A system for self lubricating an apparatus driven by an electric motor as described in claim 3 wherein the detector is a D'Arsonval movement which will issue a signal when the power required by the motor exceeds a selected set point.

5. A system for self lubricating an apparatus driven by an electric motor as described in claim 3 wherein said device for stopping said lubrication means comprises:
   a contact switch actuated by a pre-established increment of movement of the apparatus for terminating the power supplied to the lubrication means.

6. A system for self lubricating an apparatus driven by an electric motor as described in claim 3 wherein the detector is a D'Arsonval movement which has means for issuing a signal when the power required by said motor exceeds a predetermined value, said means comprising:
   an element affixed to and movable correspondingly with said D'Arsonval movement, said element having a light reflective portion and a non-reflective portion;
   means for casting a light on said element, the position of said light being adjustable with respect to said element to fix a specific set point corresponding to said predetermined value;
   photoelectric means for detecting the boundary line between the reflective and non-reflective portion of said element and for issuing a desired signal when said predetermined value is exceeded when said element moves with said D'Arsonval movement; and
   means for converting said issued signal for use in actuating said lubrication means.

7. A system for self lubricating an apparatus driven by an electric motor as described in claim 6 wherein a time delay device is connected between the said D'Arsonval means and means for converting said signal whereby actuation of the lubrication system is delayed for a predetermined duration, such delay being for the purpose of preventing lubrication when the actuating signal results from the detection of temporary frictional loads.

8. A system for self lubricating an apparatus driven by an electric motor as described in claim 3 wherein there is connected between the said signal means and said detector means an overload timing device which will prevent actuation of the lubrication system for a predetermined duration, such delay being for the purpose of preventing lubrication when the actuating signal results from the detection of temporary frictional loads.

9. A system for self lubricating an apparatus driven by an electric motor as described in claim 3 wherein said lubrication means comprises:
   a plurality of lubrication conduits for channeling lubrication to different parts of the apparatus;
   a signal operated valve in each of said lubrication conduits;
   means for operating said valves;
   an electric motor driven pump connected to said lubrication conduits for pumping lubrication therethrough; and
   a switching means connected in the power lines to said pump driving motor, said switching means being actuated by said signal means to provide power to said pump driving motor to actuate the lubrication system.

10. A system for self lubricating an apparatus driven by an electric motor as described in claim 9 wherein the said device for stopping said lubrication means comprises:
    a contact switch actuated in a continuous on and off manner by the movement of the apparatus;
    a counter connected to said contact switch for counting pulses which occur each time said contact switch is actuated;
    a stepping switch connected to said counter for terminating power to said pump driving motor, said switching means being actuated by said counter after a pre-established period of lubrication has been determined by the number of pulses counted by said counter; and
    a reset means operated by said stepping switch for resetting the system for further detection of an increase in friction on the apparatus.

11. A system for self lubricating an apparatus driven by an electric motor as described in claim 9 wherein the means for operating said valves comprises:
    a contact switch actuated in a continuous on and off manner by the movement of the apparatus;
    a counter connected to said contact switch for counting pulses which occur each time said contact switch is actuated; and
    a stepping switch connected to said counter and to said valves, said stepping switch being periodically actuated by said counter in a predetermined manner based on the number of pulses counted by said counter, such that the said valves are selectively operated to sequentially channel lubrication into said conduits for lubricating the different parts of the apparatus.

12. A system for self lubricating an apparatus driven by an electric motor as described in claim 3 wherein the said device for stopping said lubrication means comprises:

a contact switch actuated in a continuous on and off manner by the movement of the apparatus;

a counter connected to said contact switch for counting pulses which occur each time said contact switch is actuated;

a stepping switch connected to said counter for terminating power to said lubrication system, said switching means being actuated by said counter after a pre-established period of lubrication has been determined by the number of pulses counted by said counter; and a reset means operated by said stepping switch for resetting the system for further detection of an increase in friction on the apparatus.

13. A system for self lubricating the chain on a conveyor which is driven by an electric motor comprising:
   a reservoir of lubricant;
   an electrical motor driven pump connected to said reservoir of lubricant;
   a conduit leading from the outlet side of said pump to the chain of the conveyor;
   a detector for detecting increases in the power required by the electric motor driving the conveyor chain;
   a signal transmitter connected to said detector for registering and transmitting a signal when the increase in power required by the electric motor is detected by said detector;
   a motor starter connected to said signal transmitter for starting the electric pump driving motor;
   a counter actuated by a pre-determined length of movement of said chain which will register the particular length of movement by the chain;
   a switch connected to said counter for operation when the counter has registered a pre-determined length of movement by the chain and further connected to said pump motor power leads for terminating the power thereto when said chain has moved the pre-determined distance for oiling purposes so that upon such cut off the chain will have been adequately oiled, and the system may be utilized for a second oiling cycle in the event said detector detects an increase in the power required by the motor driving the conveyor chain.

14. A system for self lubricating the chain on a conveyor which is driven by an electric motor as described in claim 13 wherein said detector is a D'Arsonval movement within the power supply line of a direct current electric motor and connected at the output side thereof to said signal amplifying device for transmission of a detected increase in the power required by the direct current electric motor which drives the conveyor chain.

15. A system for self lubricating the chain on a conveyor which is driven by an electric motor as described in claim 14 further comprising:
   a high pressure air line connected to said oil conduit at a proximate point from the conveyor chain;
   valve means for conducting the air of said high pressure air line into said conduits for purging said conduits of any oil after the foregoing oiling cycle has been completed so that the conduits will not be clogged by oil deposits therein.

16. A system for self lubricating the chain on a conveyor which is driven by an electric motor as described in claim 15 wherein said valve means is actuated when said pump motor has the power thereto terminated, so that upon termination of the oiling cycle over the particular distance of movement, the oil will be self purged from said spray heads.

17. A method of self lubricating an electrically driven apparatus having a lubrication means appurtenant and connected thereto comprising:
   detecting an increase in the power required by the electrically driven apparatus which is indicative of the friction between the parts of the electrically driven apparatus and the attendant lubrication required thereby;
   issuing a signal indicating an increase in the power required;
   actuating the lubrication means by the issued signal so that the electrically driven apparatus will be lubricated thereby.

18. A method of self lubricating an electrically driven apparatus having a lubrication means appurtenant and connected thereto as disclosed in claim 17 further comprising;
   measuring the duration of lubrication by the lubrication means;
   terminating the lubrication of said electrically driven apparatus by the lubrication means after a pre-determined duration has been measured.

References Cited

UNITED STATES PATENTS

| | | | |
|---|---|---|---|
| 3,053,371 | 9/1962 | Fischer | 184—15 X |
| 3,148,747 | 9/1964 | Batchelar | 184—15 |
| 3,165,171 | 1/1965 | Baeriswyl | 184—3 |

LAVERNE D. GEIGER, Primary Examiner

E. J. EARLS, Assistant Examiner

U.S. Cl. X.R.

184—6